March 5, 1968 W. R. TOMPKINS 3,372,343
CONSTANT CURRENT GENERATOR SYSTEM
Filed May 4, 1965
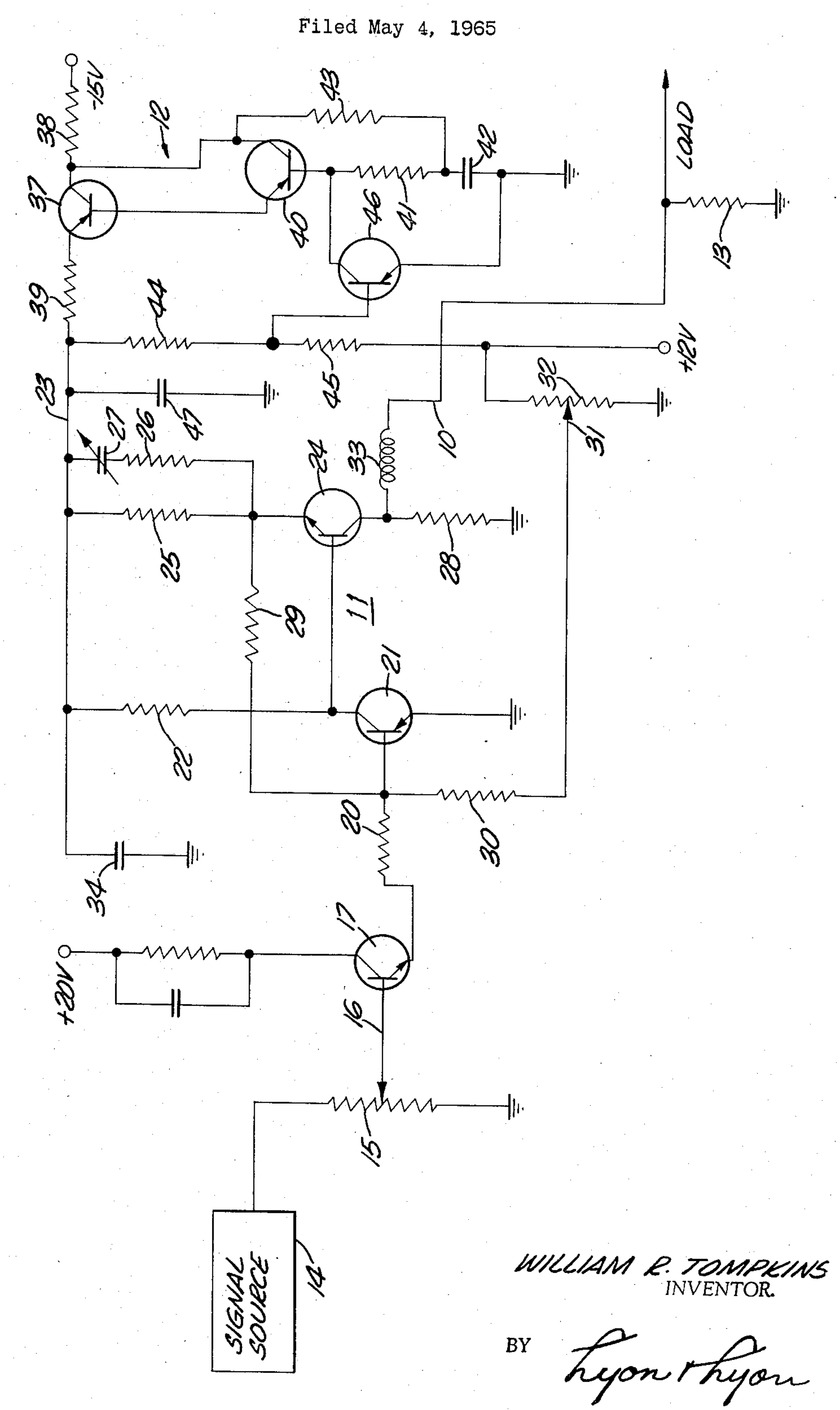
WILLIAM R. TOMPKINS
INVENTOR.
BY Lyon & Lyon
ATTORNEYS 3,372,343

CONSTANT CURRENT GENERATOR SYSTEM

William R. Tompkins, San Diego, Calif., assignor to Cohu Electronics, Inc., San Diego, Calif., a corporation of Delaware Filed May 4, 1965, Ser. No. 453,117
10 Claims. (Cl. 330—17)

This invention relates to an amplifier circuit and more particularly relates to an amplifier circuit that is especially suited for driving a long transmission line.

In numerous electrical systems, it is necessary that an electrical signal be passed through an electrically long line or cable. For reasons well known to those skilled in the art, it is necessary for maximum signal transfer efficiency that each end of the line be terminated in an impedance having a value equal to the characteristic impedance of the line. In conventional video systems, this is accomplished by terminating the load end of the line with an impedance equal to the characteristic impedance of the line and driving the line with a potentiometric feedback amplifier connected to the line through a series impedance having a value equal to the characteristic impedance of the line. Such systems are not completely satisfactory as it is extremely difficult to get a zero output impedance from the amplifier and thus the impedance match is not maximized.

It is therefore an object of the present invention to provide a system which permits extremely accurate impedance matching for an electrical line.

It is also an object of the present invention to provide such a system in which a transmission line is driven by an amplifier which does not appreciably load the line.

It is another object of the present invention to provide such a system in which the amplifier is operational in nature and serves as a constant current source.

These and other objects and advantages of the present invention will become more apparent upon reference to the accompanying description and drawing in which the single figure is an electrical schematic diagram of the system of the present invention.

Turning now to the drawing, a transmission line 10 is driven by an amplifier 11, the energizing potential for which is supplied by a voltage regulator 12. The load end of the cable 10 is terminated in an impedance 13 which has a value equal to the characteristic impedance of the line 10, for example, 75 ohms. The signals to be translated are supplied by a signal source 14 and applied across a gain setting potentiometer 15. The wiper 16 of the potentiometer 15 is connected to the base of an NPN transistor 17 connected as an emitter follower. The output of the emitter follower transistor 17 is fed to the input of the amplifier 11. The emitter follower 17 serves as a pre-amplifier whose gain can be adjusted by means of the potentiometer 15 as required by the level of the input from the signal source 14.

The amplifier 11 receives the output of the transistor 17 through a resistor 20 which is connected to the base of a PNP transistor 21 having its emitter grounded and its collector connected through a resistor 22 to a line 23 which is connected to the voltage regulator 12 and provides the amplifier with a regulated negative potential. The collector of transistor 21 is also connected to the base of an NPN transistor 24 which is connected in complementary symmetry with transistor 21.

The emitter of transistor 24 is coupled to the line 23 through a resistor 25 and through a network consisting of a resistor 26 and an adjustable capacitor 27. The collector of transistor 24 is connected to ground through a resistor 28 which has a value equal to the characteristic impedance of the line 10, in this case, 75 ohms. The emitter of the transistor 24 is further connected to the base of transistor 21 through a feedback resistor 29. The base of transistor 21 is also connected by a resistor 30 to the wiper 31 of a potentiometer 32 connected across a positive voltage reference source, for example, +12 volts. The output of the amplifier 11 is passed through an inductance 33 and appears on the line 10. A capacitor 34 is provided to establish the line 23 as AC ground.

The voltage regulator 12 includes a PNP transistor 37 connected in series with resistors 38 and 39 between a source of negative potential, for example, −15 volts, and the line 23. A second PNP transistor 40 has its collector connected to the collector of transistor 37 and its emitter connected to the base of transistor 37. The base of the transistor 40 is connected to ground through resistor 41 and capacitor 42. The junction of resistor 41 and capacitor 42 is connected to the collectors of transistors 37 and 40 by a resistor 43. The junction of the line 23 and the resistor 39 is connected to the +12 volt reference source by resistors 44 and 45. The junction of these resistors is connected to the base of a PNP transistor 46 whose collector is connected to the base of transistor 40 and whose emitter is grounded. Decoupling of the amplifier 11 from the voltage regulator 12 is provided by the capacitor 47.

The operation of the just described circuit is as follows. The transistors 21 and 24 form a high gain complementary symmetry amplifier having a feedback path through the resistor 29. This circuit is essentially an operational amplifier whose DC voltage output is determined by the values of the input resistor 30 and the feedback resistor 29 together with the voltage developed across the potentiometer 32 and thus the transistor 24 serves as a constant current source. The output impedance of the collector of the transistor 24 is extremely high so that the impedance seen looking back from the line or cable 10 is that of the resistor 28 which, of course, matches the impedance of the line. The inductance 33 is provided to compensate for the effect of the output capacitance of the collector.

Because the line or cable 10 has losses at high frequencies caused by skin effect and the like, the resistor 26 and variable capacitor 27 are inserted in the emitter circuit of transistor 24. Since the collector current of the transistor 24 nearly equals the emitter current, this resistance-capacitance network can increase current gain at higher frequencies to compensate for cable losses because its impedance decreases with increasing frequency while the voltage stays constant because the AC voltage is determined by resistors 20 and 29. The values of the resistor 26 and the capacitor 27 are chosen to approximate as closely as possible the R.F. losses in the cable. The potentiometer 32 and the resistor 30 provide the amplifier with a variable bias which performs two functions. First, it is used to compensate for changes in DC bias set by the gain potentiometer 15. Second, it permits bias to be added to limit dissipation in transistor 21 and thereby permits the use of a transistor having wide bandwidth characteristics.

With regard to the operation of the voltage regulator 12, if the output voltage appearing at the junction of resistors 39 and 44 varies, the total voltage across resistors 44 and 45 and thus the potential at their junction also varies, causing a change in conductivity of transistor 46. This changes the potential at the base of the transistor 40 and causes its conductivity to vary, resulting in a variation in conductivity of the transistor 37 and the consequent return of the potential on the line 23 to the proper value.

From the foregoing description, it can be seen that an amplifier has been provided that provides a constant current source that does not load a line or cable and is not responsive to variations within the amplifier itself. The output impedance of the amplifier is extremely high so that the line sees only the terminating impedance connected across it, which impedance has a value equal to the characteristic impedance of the line itself. Extremely accurate impedance matching and maximum signal transfer is thereby obtained. The features of this constant current generator particularly useful in systems such as that disclosed in application Ser. No. 453,116 filed May 4, 1965 by James L. Kimball, Harold R. Ahrens and the present inventor entitled, "Video Switching System," and assigned to the assignee of the present application, the disclosure of which is incorporated by reference herein.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An amplifier circuit for driving an electrically long line having a characteristic impedance, comprising: a source of signals, an output circuit, a first transistor, resistive means for applying signals from said source to the base of said first transistor, a source of regulated potential, means for connecting the emitter and the collector of said first transistor in series with said source of potential, a second transistor having complementary symmetry with said first transistor, means for connecting the emitter and the collector of said second transistor in series with said source of potential, means connecting the collector of said first transistor to the base of said second transistor, resistive means connecting the emitter of said second transistor to the base of said first transistor, means coupling the collector of said second transistor to said output circuit, and an impedance connected to the collector of said second transistor and across said output circuit, said impedance having a value equal to said characteristic impedance.

2. An amplifier circuit for driving an electrically long line having a characteristic impedance comprising: a source of signals, an output circuit, a first transistor, resistive means for applying signals from said source to the base of said first transistor, a source of regulated potential, means for connecting the emitter and collector of said first transistor in series with said source of potential, a second transistor having complementary symmetry with said first transistor, means connecting the emitter and collector of said second transistor in series with said source of potential, said means including an impedance network, the impedance of which decreases with increasing frequency, means connecting the collector of said first transistor to the base of said second transistor, resistive means connecting the emitter of said second transistor to the base of said first transistor, means coupling the collector of said second transistor to said output circuit, and an impedance connected to the collector of said second transistor and across said output circuit, said impedance having a value equal to said characteristic impedance.

3. The circuit of claim 2 wherein said impedance network comprises a first resistor connected in parallel with the series combination of a second resistor and a capacitor.

4. The circuit of claim 2 wherein said coupling means is an inductor.

5. The circuit of claim 2 wherein means are provided for coupling the end of said impedance network remote from said second transistor to ground, said means including a capacitor.

6. An amplifier circuit for driving an electrically long line comprising having a characteristic impedance: a source of signals, an output circuit, a first transistor, resistive means for applying signals from said source to the base of said first transistor, a source of regulated potential, means for connecting the emitter and collector of said first transistor in series with said source of potential, a second transistor having complementary symmetry with said first transistor, means connecting said second transistor in series with said source of potential, said means including an impedance network, the impedance of which decreases with increasing frequency, means connecting the collector of said first transistor to the base of said second transistor, resistive means connecting the emitter of said second transistor to the base of said first transistor, a reference potential source, means for applying a portion of said reference potential to the base of said first transistor, means coupling the collector of said second transistor to said output circuit, and an impedance connected to the collector of said second transistor and across said output circuit, said impedance having a value equal to said characteristic impedance.

7. An amplifier circuit for driving an electrically long line comprising having a characteristic impedance: a source of signals, an output circuit, a first transistor connected as an emitter follower, attenuating means coupling said source of signals with the base of said first transistor, a second transistor, resistive means connecting the emitter of said first transistor to the base of said second transistor, a source of regulated potential, means for connecting the emitter and collector of said second transistor in series with said source of potential, a third transistor having complementary symmetry with said second transistor, means connecting said third transistor in series with said source of potential, said means including an impedance network, the impedance of which decreases with increasing frequency, means connecting the collector of said second transistor to the base of said third transistor, resistive means connecting the emitter of said third transistor to the base of said second transistor, a reference potential source, means for applying a portion of said reference potential source to the base of said second transistor, means coupling the collector of said third transistor to said output circuit, and an impedance connected to the collector of said third transistor and across said output circuit, said impedance having a value equal to said characteristic impedance.

8. An amplifier circuit for driving an electrically long line having a characteristic impedance comprising: a source of signals, an output circuit, a source of regulated negative potential, a reference potential source, a first PNP transistor, means including first resistive means for applying signals from said signal source to the base of said first transistor, second resistive means connecting the collector of said first transistor to said source of regulated negative potential, means connecting the emitter of said first transistor to ground, a second transistor of NPN type, third resistive means connecting the emitter of said second transistor to said source of regulated negative potential, an impedance network connected in parallel with said third resistive means, said impedance network including a resistor and a capacitor, capacitive means coupling the end of said impedance network remote from said second transistor to ground, impedance means connecting the collector of said second transistor to ground, said impedance means having a value equal to said characteristic impedance, conductive means connecting the collector of said first transistor to the base of said second transistor, fourth resistive means coupling the emitter of said second transistor to the base of said first transistor, potentiometer means connected across said reference potential source, said potentiometer means including a wiper, fifth resistive means connecting said wiper to the base of said first transistor, and means connecting the collector of said second transistor to said output circuit.

9. The circuit of claim 8 wherein the last mentioned means includes an inductor.

10. The circuit of claim 8 wherein said means for applying signals further includes a gain setting potentiometer connected across said source of signals and an emitter follower transistor connected to the wiper of said gain setting potentiometer, the output of said emitter follower being connected to said first resistive means.

References Cited

UNITED STATES PATENTS

| | | | |
|---|---|---|---|
| 2,858,424 | 10/1958 | Stern et al. | 330—17 |
| 3,267,386 | 8/1966 | Davis et al. | 330—17 |

ROY LAKE, *Primary Examiner.*

E. C. FOLSOM, *Assistant Examiner.*